United States Patent
Pflug

(10) Patent No.: US 10,733,892 B2
(45) Date of Patent: Aug. 4, 2020

(54) DRIVER ASSISTANT SYSTEM USING INFLUENCE MAPPING FOR CONFLICT AVOIDANCE PATH DETERMINATION

(71) Applicant: MAGNA ELECTRONICS INC., Auburn Hills, MI (US)

(72) Inventor: Goerg Pflug, Weil der Stadt (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 96 days.

(21) Appl. No.: 16/173,080

(22) Filed: Oct. 29, 2018

(65) Prior Publication Data
US 2019/0066508 A1    Feb. 28, 2019

Related U.S. Application Data

(63) Continuation of application No. 15/700,273, filed on Sep. 11, 2017, now Pat. No. 10,115,310, which is a (Continued)

(51) Int. Cl.
G08G 1/16    (2006.01)
B62D 6/00    (2006.01)
(Continued)

(52) U.S. Cl.
CPC .............. *G08G 1/163* (2013.01); *B60T 7/22* (2013.01); *B60W 10/04* (2013.01);
(Continued)

(58) Field of Classification Search
None
See application file for complete search history.

(56) References Cited

U.S. PATENT DOCUMENTS

| 4,720,790 A | 1/1988 | Miki et al. |
| 4,987,357 A | 1/1991 | Masaki |

(Continued)

FOREIGN PATENT DOCUMENTS

| DE | 102006034254 A1 | 4/2007 |
| DE | 102008027590 A1 | 1/2009 |

(Continued)

*Primary Examiner* — Todd M Melton
*Assistant Examiner* — Jason R Roberson
(74) *Attorney, Agent, or Firm* — Honigman LLP

(57) ABSTRACT

A vehicular control system for a vehicle includes a plurality of sensors. Responsive to data processing, the vehicular control system determines respective speeds of the determined vehicles and respective directions of travel of the determined vehicles, and determines respective influence values for the determined vehicles based on determined potential hazards to the equipped vehicle presented by the respective determined vehicles. The determined respective influence value for each determined vehicle is weighted according to direction and/or magnitude of a speed vector of that determined vehicle. The weighted determined respective influence values for the determined vehicles are ranked according to their hazard potential. A path of travel is selected from the plurality of determined paths responsive at least in part to the rankings of the weighted determined respective influence values. The system at least in part controls vehicle steering to guide the equipped vehicle along the selected path of travel.

31 Claims, 7 Drawing Sheets

Related U.S. Application Data continuation of application No. 14/016,790, filed on Sep. 3, 2013, now Pat. No. 9,761,142.

(60) Provisional application No. 61/718,382, filed on Oct. 25, 2012, provisional application No. 61/696,416, filed on Sep. 4, 2012.

(51) Int. Cl.
  *B60W 30/10* (2006.01)
  *B60W 10/184* (2012.01)
  *B60T 7/22* (2006.01)
  *B62D 15/02* (2006.01)
  *B60W 10/04* (2006.01)
  *B60W 10/20* (2006.01)
  *B60W 30/095* (2012.01)

(52) U.S. Cl.
  CPC .......... *B60W 10/184* (2013.01); *B60W 10/20* (2013.01); *B60W 30/095* (2013.01); *B60W 30/10* (2013.01); *B62D 6/00* (2013.01); *B62D 15/0265* (2013.01); *G08G 1/166* (2013.01); *B60W 2420/42* (2013.01); *B60W 2520/10* (2013.01)

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |

(56) References Cited

U.S. PATENT DOCUMENTS

| | | |
|---|---|---|
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,023 A | 8/2000 | Schofield et al. |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,201,642 B1 | 3/2001 | Bos et al. |
| 6,222,447 B1 | 4/2001 | Schofield et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,442,484 B1 | 8/2002 | Miller |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,850,156 B2 | 2/2005 | Bloomfield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | De Wind et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |

(56) References Cited

U.S. PATENT DOCUMENTS

| | | |
|---|---|---|
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 8,013,780 B2 | 9/2011 | Lynam et al. |
| 8,027,029 B2 | 9/2011 | Lu et al. |
| 8,058,977 B2 | 11/2011 | Lynam |
| 8,340,866 B2 | 12/2012 | Hanzawa et al. |
| 8,473,144 B1 * | 6/2013 | Dolgov .............. G01C 21/3407 701/28 |
| 8,694,224 B2 | 4/2014 | Chundrlik, Jr. et al. |
| 8,849,495 B2 | 9/2014 | Chundrlik, Jr. et al. |
| 9,761,142 B2 | 9/2017 | Pflug |
| 10,115,310 B2 | 10/2018 | Pflug |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0179084 A1 | 9/2003 | Skrbina et al. |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0290479 A1 | 12/2006 | Akatsuka et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0180529 A1 | 7/2008 | Taylor et al. |
| 2009/0037052 A1 | 2/2009 | Ogasawara et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |
| 2010/0228437 A1 | 9/2010 | Hanzawa et al. |
| 2011/0246156 A1 | 10/2011 | Zecha et al. |
| 2012/0033196 A1 | 2/2012 | Vanek et al. |
| 2012/0062743 A1 | 3/2012 | Lynam et al. |
| 2012/0218412 A1 | 8/2012 | Dellantoni et al. |
| 2012/0245817 A1 | 9/2012 | Cooprider et al. |
| 2012/0262340 A1 | 10/2012 | Hassan et al. |
| 2012/0303222 A1 | 11/2012 | Cooprider et al. |
| 2013/0124052 A1 | 5/2013 | Hahne |
| 2013/0131918 A1 | 5/2013 | Hahne |
| 2013/0231825 A1 | 9/2013 | Chundrlik, Jr. |
| 2014/0067206 A1 | 3/2014 | Pflug |
| 2014/0309884 A1 | 10/2014 | Wolf |
| 2014/0313339 A1 | 10/2014 | Diessner |

FOREIGN PATENT DOCUMENTS

| | | |
|---|---|---|
| DE | 102008062916 A1 | 6/2010 |
| WO | WO2013/081985 | 6/2013 |

* cited by examiner

| Influence level | Object A | Object B | Object C | Object D | Object D |
|---|---|---|---|---|---|
| speed metric | 5 | 5 | 4 | 2 | 2 |
| vehicle type metric - hazard | 10 | 9 | 14 | 3 | 3 |
| vehicle type metric - vulnerability | 6 | 9 | 4 | 30 | 0 |
| distance metric | 6 | 6 | 10 | 5 | 20 |
| Sum | 27 | 29 | 32 | 40 | 25 |

TABLE 1

FIG. 4

| speed metric | interval | | influence level add on |
|---|---|---|---|
| stopped | 0..3 | km/h | 2 |
| very low | 3..15 | km/h | 3 |
| low | 15..30 | km/h | 4 |
| medium | 30..60 | km/h | 5 |
| fast | 60..130 | km/h | 6 |
| high | 130..170 | km/h | 7 |
| very high | >170 | km/h | 8 |

TABLE 2

FIG. 5

| object/vehicle type metric | influence level add on | |
|---|---|---|
| | hazard (mass and size) | vulnerability |
| pedestrian | 3 | 30 |
| cyclist | 4 | 23 |
| motor cyclist | 4 | 17 |
| small car | 8 | 13 |
| midsize car | 9 | 9 |
| large car | 10 | 6 |
| truck | 14 | 4 |
| road train | 18 | 3 |
| train | 25 | 2 |
| curbstone | 3 | 0 |
| pole | 5 | 2 |
| bush | 3 | 3 |
| tree | 6 | 3 |
| grass | 0 | 2 |
| boundary strip | 0 | 1 |
| lane marker strip | 0 | 1 |
| barrier | 6 | 3 |
| ... | | |

TABLE 3

FIG. 6

| distance metric | interval | | influence level add on |
|---|---|---|---|
| extremely close | 0..0,4 | m | 50 |
| very close | 0,4..1 | m | 20 |
| quite close | 1..1,8 | m | 16 |
| nearby | 1,8..3 | m | 13 |
| in the near | 3..10 | m | 10 |
| near distance | 10..20 | m | 8 |
| in a distance | 20..40 | m | 6 |
| quite far | 40..80 | m | 5 |
| far | 80..150 | m | 4 |
| very far | 150..300 | m | 3 |
| in sight | 300..500 | m | 2 |
| nearly visuable distant | >500 | m | 1 |
| ... | | | |

TABLE 4

FIG. 7

DRIVER ASSISTANT SYSTEM USING INFLUENCE MAPPING FOR CONFLICT AVOIDANCE PATH DETERMINATION

CROSS REFERENCE TO RELATED APPLICATIONS

The present application is a continuation of U.S. patent application Ser. No. 15/700,273, Sep. 11, 2017, now U.S. Pat. No. 10,115,310, which is a continuation of U.S. patent application Ser. No. 14/016,790, filed Sep. 3, 2013, now U.S. Pat. No. 9,761,142, which is related to U.S. provisional application Ser. No. 61/718,382, filed Oct. 25, 2012 and Ser. No. 61/696,416, filed Sep. 4, 2012, which is hereby incorporated herein by reference in its entirety.

FIELD OF THE INVENTION

The present invention relates to imaging systems, vision systems and/or driver assistance systems for vehicles and, more particularly, to a machine vision system for full or partially autonomies driving and evasive steering and braking for collision avoidance and impact degrading.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Use of plural imaging sensors and environmental sensors in vehicle machine vision and (human) vision systems are known. It is known to fuse vehicle sensors for achieving redundant or enhanced data in combination. Redundancy adds to the security of the driver assistant system.

To use the input of multiple sensor systems for a conflict or collision avoidance and impact degrading system utilizing object detection and tracking is also known. The task of the collision avoidance system is to analyze the sensor data to determine the potential environmental collision hazards for either initiating warnings, evasive steering, braking, acceleration or to capture a record.

SUMMARY OF THE INVENTION

The present invention provides a conflict avoidance system or vision system or imaging system for a vehicle that utilizes two or more cameras to capture images exterior of the vehicle (such as forward and/or rearward of the vehicle), and provides the communication/data signals, including camera data or image data, that may be displayed at a display screen that is viewable by the driver of the vehicle, such as when, for example, the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle.

The present invention provides a driver assistance system or conflict or collision avoidance system or vision system or imaging system for a vehicle that utilizes one or more cameras or other external sensors to capture data or images exterior of the vehicle, and an (image) data processor/processing system for determining the potential environmental collision hazards for initiating evasive steering, braking and/or acceleration. The system of the present invention fills the vehicle's environmental detected hazardous objects properties influence into a 2D influence map. The higher the object's hazardous potential (such as due to a greater speed of the object or due to the direction of travel of the object, such as when an object is determined to be heading in a direction of travel towards the equipped vehicle or into the path of travel of the equipped vehicle), the greater the object's environment or surroundings becomes influenced (and thus a greater influence value or weighting is applied to that object by the system of the present invention). The driver assistance system or conflict or collision avoidance system chooses the optimal path around the objects with the least influence or potential conflict or obstruction within the influence map.

Optionally, the vehicle's maneuvering and braking abilities and metha information or other data (such as geographic, altitude, seasonal, climate, weather, urban vs. rural location, traffic density, car2car/car2x data, or the like) and/or other environmental properties or considerations may be considered as well. Optionally, legislative and ethical considerations may also be considered in determining the objects' influence ratings.

These and other objects, advantages, purposes and features of the present invention will become apparent upon review of the following specification in conjunction with the drawings.

BRIEF DESCRIPTION OF THE DRAWINGS

FIG. 4 is a table (TABLE 1) showing an example of a ranking scheme, with the gray deposited values have the highest ranking value;

FIG. 5 is a table (TABLE 2) showing how speed of an object relative to the equipped vehicle may be taken into account as an influence rating parameter;

FIG. 6 is a look up table (TABLE 3) showing data that may be provided with entries that may be specified by the system's manufacturer, the vehicle's manufacturer or by legislation or commissions; and FIG. 7 is a table (TABLE 4) showing how distance of an object to the equipped vehicle may be taken into account as an influence rating parameter.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from the vehicle cameras and may provide a displayed image that is representative of the subject vehicle (such as for a top down or bird's eye or surround view, such as discussed below).

Figure 1:
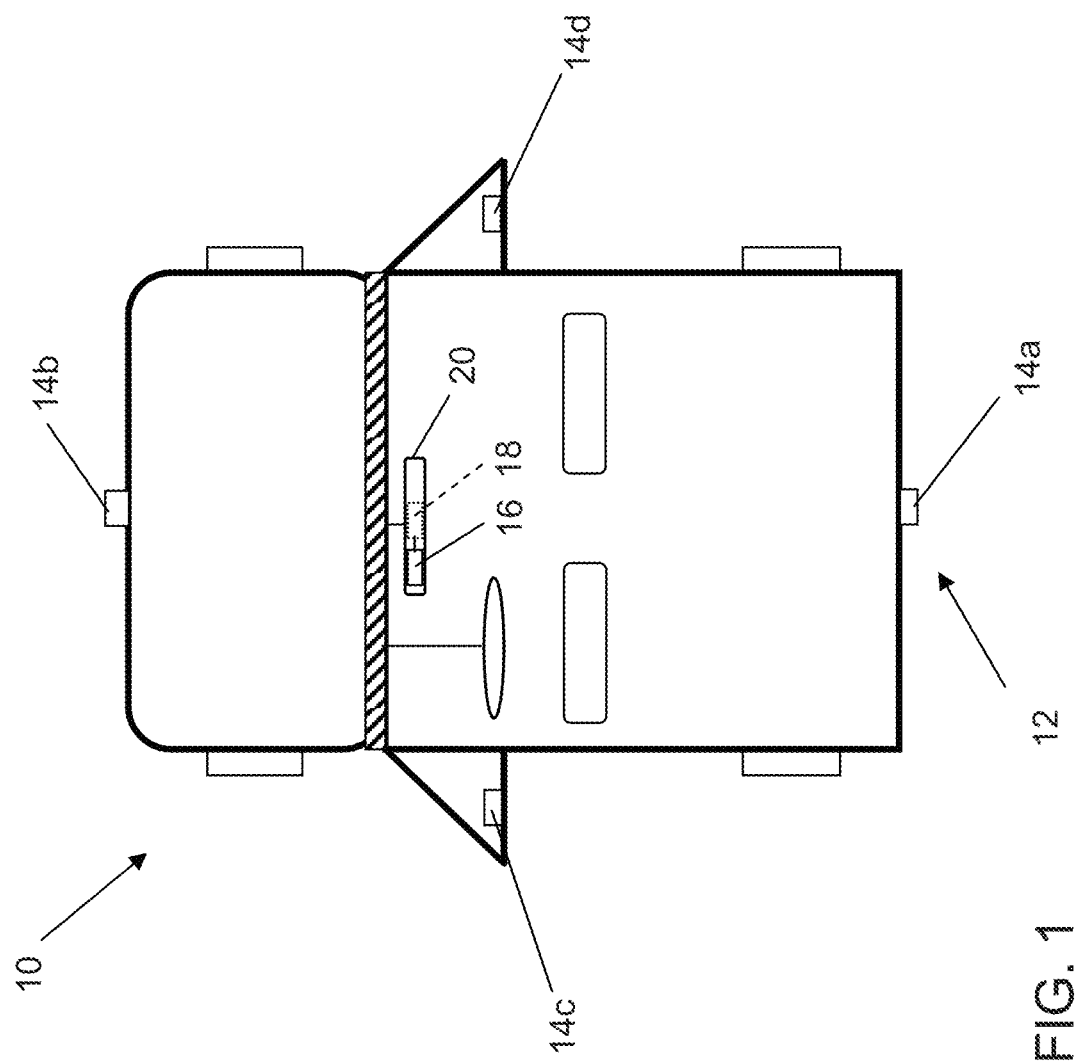
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sideward/rearward facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

2D and 3D environment reconstruction out of image and sensor data is used to determine potential hazards in the path of the vehicle. The system may judge the object's properties and resulting potential as a hazard. Although it is known to rate hazardous influence in a so called influence map in robotics and computer games (influence mapping), automotive applications present challenges overcome by the present invention. The present invention uses an influence map for generating a manageable number of collision avoidance and impact degrading paths by following the most promising during computing.

Figure 2:
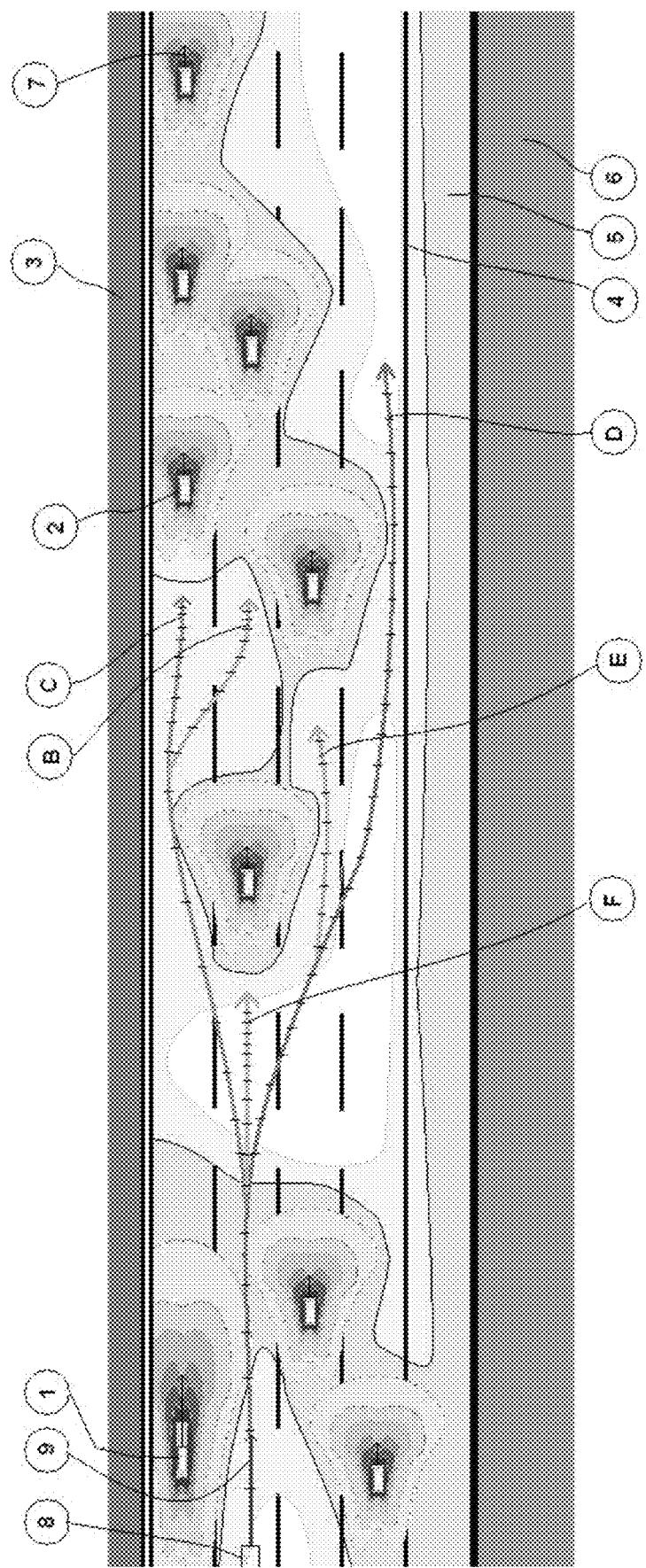
FIG. 2 is a schematic top view of an influence map of a (typical) highway scene (no pedestrian, no cyclist, no cross traffic, no opposing traffic) in accordance with the present invention.

With reference to FIG. 2, (A) represents distance markers within a time frame (speed) (the more the distance, the faster), (B) represents a collision avoidance and impact degrading (steering and braking or acceleration) path, (C) represents a collision avoidance and impact degrading (steering and braking or acceleration) path, (D) represents a collision avoidance and impact degrading (steering and braking or acceleration) path, (E) represents a collision avoidance and impact degrading (steering and braking or acceleration) path, and (F) represents a collision avoidance and impact degrading (steering and braking or acceleration) path. Also, (1) represents a relatively fast vehicle and (2) represents a relatively slow vehicle. (3) represents an opposing road side (very high influence level), (4) represents a side strip, (5) represents a hard shoulder/emergency lane (high influence level), and (6) represents a soft shoulder (very high influence level). As shown in FIG. 2, (7) represents a speed vector of another vehicle, and (8) represents the subject vehicle having a relatively high speed, faster than vehicle (1), and (9) represents the subject vehicle's own speed vector.

In the illustration of FIG. 2, all of the vehicles are running with more or less high speed and in the same direction (see (1), (7) and (9)), since a highway scene is shown (with high traffic, but without any traffic jam or accidents or the like). At the assumption that the subject vehicle (8) is closing to the given scenario with a higher speed (9) than the fastest other vehicle (1), the collision intervention system may engage. There may be alert levels employed for determining the necessarily actions to warn or intervene. The driver's driving ability may be reflected by that. The further on assumption is that the necessity of the intervention system to engage may have been given. Due to the fact that a collision is always to be avoided and it is desirable to have a substantially conflictless driving experience, especially when being driven by a fully or partially autonomous system, the system may be engaged at all times during vehicle operation.

When engaged, the intervention system receives data about objects (such as other traffic participants or obstacles on the road) from the vehicle image sensors and/or other environmental sensors (such as a RADAR or LIDAR or LASER and/or the like) and may be via remote (car2X, car2car and/or the like). These may be already classified (such as, for example, a car, truck, cyclist, pedestrian, motorcyclist, horse carriage, policeman riding a horse, deer, lost load (as obstacle), pole, traffic island, traffic bollard and/or the like). These data are processed to create space depths map in order to receive a 3D or 2D (preferred) world reconstruction, which requires the detection of the object distances and width (preferably also the shape) via any means. Some systems deliver 3D imprint by nature, such as stereo vision camera systems, while other systems reconstruct by sensor fusion, such as mono camera systems plus a distance measuring laser.

The identified objects are mapped into the 2D (top view) influence map (FIG. 2). By monitoring the surrounding objects, the system is able to determine the speed and direction of each object. That information becomes attached to each object as a speed vector (7). The hazardous potential of each object becomes rated by the determination algorithm. The faster an object is (relative to the subject or host or equipped vehicle), the stronger its influence value is (see Tables 1 and 2) and a greater weighting or influence irradiation is applied to the faster object or objects. The influence rating or weighting factors equates to the colors or shading in the two dimensional influence map of FIG. 2, where the higher the influence of an object the darker the color or shading there is at or around the object.

The influence becomes irradiated to (increased or weighted towards) the equating objects area. The influence or weighting is weighted more forward and backward of a vehicle than sideward, since vehicles typically do not interfere substantially massively sideward. The faster an object's speed is, the more the object irradiates ahead. As can be seen in FIG. 2, the irradiation of an object quite close to another does coalescence when these superpose, such that groups of objects form areas with an elevated level of irradiation. It is the task of the algorithm to search the least dangerous collision avoidance and impact degrading path. This is done by laying out a future path of travel of the subject vehicle under consideration of the vehicle's maneuvering, braking and acceleration physics. There may be a vehicle kinematic model or look up table employed which may be generated very precisely, but may deliver just the most significant (may be quite simplified) key data necessary for generating a feasible path.

Also the future paths of travel of all known foreign vehicles (or objects) are estimated. Assumptions of their reaction time, maneuvering, braking and acceleration physics/abilities may have to be made. Different object classes may have different driving parameter assumptions. These may add to the objects' influence on the map. Additionally, the system may take metha data into account depending on the situation. This may comprise data from a navigation system, such as data that, for example, includes information as to whether the soft shoulder is drivable in an emergency (or may be a canyon), weather condition data, road surface data, (subject vehicle's) tire wear and inflation data, and the like, either provided by on board data storage or sensors and systems or from remote sensors or systems or data storage.

To lay out conflict or collision avoidance and impact degrading paths, the system seeks to plan a path with the least interference of the irradiation (lowest level of influence) and the lowest level of length wise and side wise acceleration (lowest level of steering intervention and hard braking or strong acceleration), and optionally the least irritation to other traffic participants (reflected by the choice of the resulting paths at the end of determination). Within the influence map of FIG. 2, this means that the least speed marker change over distance {f(distance/time)} and the path's curvature. At times when the system determines that an accident is unavoidable, the system may seek a path which reduces or minimizes the hazard of an impact. This is why other vehicles' influence maps have quite longer extension at the edges than on the center of the rear (and front). An offset impact is always more dangerous than a central impact (statistical evidence supports this). Since there are a large number of possible assumed future scenarios of the subject vehicle's driving behavior and other traffic participants' driving behavior and the other interactions, the resulting reactions becomes huge even for just a few (milli-) seconds into the future, such that the system may have assessment algorithm and criteria to filter out the "interesting" (most matching to the criteria) ones and to proceed to predetermine these rather than to predetermine all (hundreds) of the possibilities together. This may lead to optimal and to suboptimal results.

In the example of an influence map based path determination of FIG. 2, the 'interesting' paths are identified by 'B', 'C', 'D', 'E' and 'F'. It becomes apparent that path 'F' may be a quite undesirable choice to go with since it requires hard braking. At path 'E' and 'B', there are quite hectic steering maneuvers involved, which may lead other traffic participants to panic maneuvers or at least being irritated. Path 'C' is already capable to be considered quite safe, but the subject vehicle has first to accelerate and then to brake or slow down to the slow speed of the drivers ahead. Vehicle (1) has to brake more aggressively hence its braking space is diminishing by the subject vehicle changing to his or her lane. In this example, the choice of path 'D' would probably be the preferred or optimal choice, since nearly no substantial interference with any other traffic participant happens and the furthest way is free at least within the detection distance of the on board sensors (the detection distance may change under different environmental conditions, and in good cases the detection distance may extend or reach from about 30 meters to about 500 meters, depending on the system's components).

Object influence ratings may also be altered or weighted by the hazard of an impact of the subject vehicle to that of other vehicles' occupants (or other objects' occupants or the like and in the case of a pedestrian, to the pedestrian). A motorcyclist may be more vulnerable than a truck, and thus the influence value or weighting value may be chosen higher for a motorcyclist. This data may be provided by a look up table (see Table 3) with entries that may be specified by the system's manufacturer, the vehicle's manufacturer or by legislation or commissions. Ethical commissions may state whether it is preferable to endanger one motorcyclist than one school bus or other kinds of conflicting cases. Optionally, the ratings may differ in different cultural areas. By that, the system may engage a look up table which equates to the region that the vehicle is at currently (controlled online) or sold at (set at time of production).

Optionally, the distance of a foreign object to the respective vehicle may be taken into account as another influence rating parameter (see Table 4). As an optional parameter, which may gain to the influence area of a foreign object or road participant, the object or the like may be the blinking. At the times a vehicle blinks (for example, to the left), its forward irradiating 'aura' may be extended to the direction of the blinking. By that, the influence map rises in that area which may lower the probability that the own vehicle may enter the room or are that the blinking vehicle driver is intending to enter. The driver of the equipped or subject vehicle may rather stay behind the blinking vehicle.

The system is operable continuously as the vehicle is driven along the road. Thus, the system is always collecting environmental data which are fed into the influence mapping. Further, the system is recapitulating the current state in time slots (fractions of seconds long) and reevaluating the situation (by the influence map). During the milliseconds that are progressing an earlier as optimal laid out collision avoidance path may become abandoned and a better one at that state of time may be selected as the preferred or optimal path since the other traffic participants may act at least in part different than assumed earlier or objects that weren't detected previously may come into view of the sensors of the subject vehicle.

One solution for determining avoidance paths that may be optimal or semi optimal may be to handle the suspect vehicle and all foreign objects/vehicles as being like a marble having an influence value rolling or gliding over the influence map which influence values determining the heights (relate to according elevations and valleys).

The marbles may have an assumed mass 'm' exposed to an assumed gravity 'g' and an inherent inertia. When in motion already (according to the speed vectors (7) in FIG. 2), there may be an assumed kinetic energy inherent to each marble. By that the marble may be turned away and slowed down when running into the direction of an elevation and may be turned to and accelerated when heading into a valley or when a faster marble closes up from behind, which may cause the map to rise in that region. Due to the influence of each object or vehicle, the influence map under the marble may change continuously while the marble glides or rolls.

Figure 3:
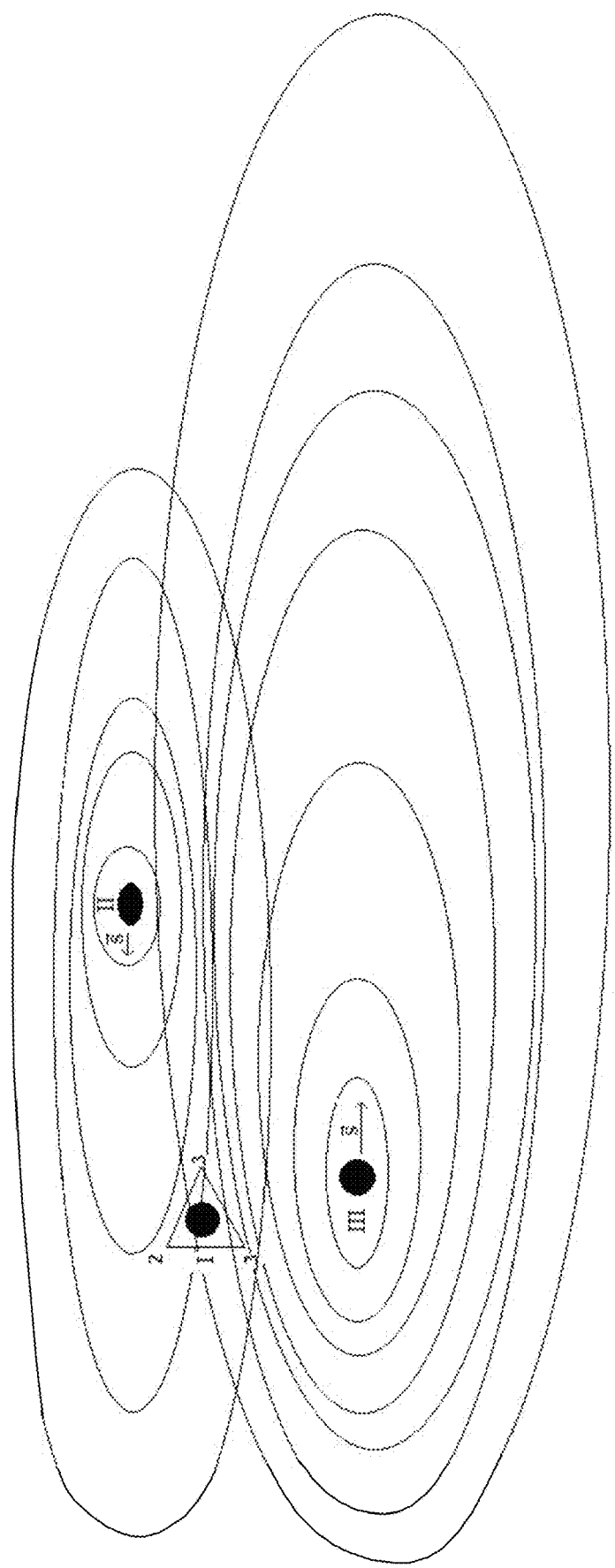
FIG. 3 is an exemplary influence map suitable for use in the system of the present invention.

More specifically, the marble's acceleration/deceleration force and direction due to the slope of its resting surface at a specific point in the map may be calculated by superpositioning each surrounding objects influence contribution. Each object's contribution may be added to one common at a certain point such as can be seen in FIG. 3. The contribution 'E' may be dependent from the distance 'r' and the influence score 'I'. Since the relative speed 's' may affect the influence that each object may advance in direction its speed vector $\vec{s}$, the speed component in the direction of 'r' may be taken into account (see equation (1)) as well.

$$E = (I/r) * \vec{s} \tag{1}$$

To calculate the slope of the area that the marble is resting on, the area may be assumed as being a triangle between three points a, b, c, with its values $E_a$, $E_b$, $E_c$, which surround the marble. The slope normal 'n' is the vector product of (a−b)×(a−c).

While calculating one marble's normal, its own influence to the influence map may not be taken into account.

The exemplary influence map in FIG. 3 shows the influence of an object or vehicle 'II' with a speed vector to the left with an influence level of the value 5 (5 rings) and an object or vehicle 'III' with a speed vector to the right with an influence level of the value 7 (7 rings), which influence areas mostly irradiate circumferential and into the direction of the speed vector. The influence level of the objects II and III to the edges of the triangle of the to be calculated object (under test) is resting on can be calculated by counting the number of rings (and by that the influence value) the specific point or area or region is enclosed in. By summing up the influence of both other objects, the triangle has two edges with the height of 3 and one with the level 2. By that, the triangle's normal is tilted to upper left from upright (and by that the slope of the triangle will be to the upper left). When simulating the next time increment, object I is accelerated into the upper left direction. In this example, the triangle is chosen quite wide for giving example. The triangle may preferably be chosen in an infinitesimal small manner and the influence calculated not in INTEGER counting rings but in FLOAT by equation (1) to match the normal vector n more precisely.

The normal and by that the accelerating component of g of each object (marble) may be calculated accordingly. At a certain point in time, each marble may have a certain inherent inertia and acceleration. By that it is possible to presume each marble's new position and speed (or inertia) at a sequential time increment. This is already sufficient to run a basic conflict and/or collision avoidance. The nature of the marbles system will be to deflect from the most influencing objects in the local surrounding. The paths which will be gone in (near) future are mostly determined by the current influence map landscape. The higher an influence level in an area is the more it influences the future course.

In practice, the increment's length may depend on the system's calculating property or environmental sensors detection rate (such as, for example, 1/30 second or thereabouts). It may be desirable to have infinitesimal small time steps for the most accurate object curve calculation.

More sophisticated systems may aspire to presume the paths with the least conflict potential, for not running into suboptimal paths. Due to the fact every successive influence map (inertia and position of each marble or object) can be calculated out of the status of its predecessor, the future approximation and acceleration conflicts may be calculatable and thus simulatable. Of course, the accuracy of the simulated result may be less the more the future time increment is. Because of that, the simulation may be repeated from the beginning at each or nearly each new time increment which passes in real time. Since identical simulation of the identical starting scenario possibly come to the simulated result, the simulation may not be able to find (simulate) alternative avoidance paths. Because of that, there may be an artificial disturbance (factor) which may (possibly randomly) take influence to the simulations results.

The disturbance may act to the subject vehicle's marble alone or may be applied to all marbles in the system. As a specific solution, the disturbance may be an acceleration impulse. As an alternative specific solution, the disturbance may be a random change of the marbles resting areas slope normal. By that, the system may 'fall' into alternative solutions at fork way points at which just small disturbances can tilt the system to one or another extreme, such as known from weather forecast simulations. Unlike weather simulations, the fork ways alternative ways may have no tendency to chaotically oscillation, may be just dampened swinging.

The found alternative paths at a current point of time may be assessed by a decision algorithm which may rank the paths by one, some or all of the following criteria or may draw a scoring by pooling one, some or all following criteria:

One path's lowest end point (after a certain amount of time increments);

One path's maximum influence elevation experienced on the whole;

One path's median influence elevation experienced on the whole way;

One path's maximum influence slope experienced on the whole way;

One path's maximum acceleration experienced on the whole way;

One path's maximum forward acceleration/deceleration experienced on the whole way;

One path's maximum lateral acceleration experienced on the whole way;

One path's maximum speed;

One path's median speed on the whole way; and/or

One path's shortest way.

In a more advance system, the simulated accelerations may be limited to stay in the physical limits of the real objects by reflecting the (may be partially assumed) objects' properties.

In further advanced systems, the system may be able to distinguish between a normal uncritical situation and a critical situation. The system may come to a decision by assessing the predetermined possible paths. There may be certain maximum limits in presumed deceleration (so braking) measures and/or lateral acceleration (hard curving) measures in all optional paths which when overrun may turn the system into a kind of 'critical' mode. Then the system may not brake as comfortable as possible, but as soon and as heavy/aggressively as possible. The system may be allowed to ignore general traffic rules. By that it may turn onto the emergency lane for evading a predicted critical situation or collision (however, the system would not make such a maneuver when in the usual 'uncritical' mode). The system may pass at the non-fast lane (overpassing on the right on right hand traffic). The system may change lanes without blinking. The system may select to go off road in case it determines that this is the least hazardous way out of the detected situation or hazardous condition.

The system may be able to adapt over time by evolutional learning of its inherent parameters. Positive scenario postulations may strengthen a parameter or parameter set, and negative scenario postulations may cause the system to alter the parameter set. Different parameter optima may be found for different driving conditions including the weather, road (motor way/city, crowded/less crowded, bumpy/smooth asphalt/gravel) and vehicle conditions.

Furthermore, advanced systems, especially when being connected in real time via car2car or car2x or the like, may jointly simulate the other vehicles' and subject vehicle's influence effects and may come to solutions which may be the common best (not necessarily the individual's best) and communicate each participants presumed and dedicated driving path. When there are objects and traffic participants in the near which are not connected, the system may assume these as comparably high influencive (and less predictable and controllable as the other connected participants), which results that these participants may be circumscribed with comparably wider clearance. The common calculation unit may be placed external as a remote server.

Therefore, the present invention provides a conflict and/or collision avoidance system that determines the position and speed of other vehicles on the road on which the subject vehicle is traveling and, when it is determined that the subject vehicle is approaching the other vehicles, the system determines one or more possible paths that avoid the other vehicles or objects and the system may select a preferred or optimal path that avoids the other vehicles and objects and requires the least aggressive maneuverings (such as hard braking and/or hard steering of the subject vehicle). The system may generate an alert to the driver of the selected path, and may display the path or paths to the driver for the driver to select. Optionally, the system may control the vehicle, such as the braking system and/or steering system of the vehicle, to assist in maneuvering through the traffic along a selected path. The system may consider the size and speed and type of the other vehicles in determining the appropriate preferred or optimal path of travel for the subject vehicle.

As discussed above, the system may be operable to classify and 'label' or identify one or multiple object(s) and to set the speed and trajectory parameters and 'hatha' properties to rank their hazardous potential or influence, even when the detected object is far from the subject vehicle and still a "spot" on the horizon, and when detection systems such as radar, laser and cameras are still unable to determine such parameters of the distant object. This hazardous influence ranking may be done by taking the speed, the distance, the size, the mass and the deformability and vulnerability of the subject vehicles or objects into account. There may be a look up table of each object's property influence value in use. In order to avoid overwhelming the driver with too many object's information and data, there may be a certain level of influence or a limited number of objects with the highest ranking which become brought to the driver's attention. In the example of such a ranking scheme shown in Table 1 (with Tables 2-4 showing sub tables of the used metrics) the gray deposited values are these of the three with the highest ranking value which would be the data of choice. When the vehicles' desired destinations are known due to data transmission, the intended paths can become predetermined. As Mehta information, the local traffic rules may be regarded by the rating algorithms as well as when choosing the ranking of the information which will become presented to the driver.

The system may utilize one or more sensors in detecting objects and vehicles on the road ahead and alongside (and optionally behind) the subject vehicle. For example, the subject vehicle may include one or more cameras or imagers that capture image data of the scene occurring forwardly and/or sidewardly and/or rearwardly of the subject vehicle. The cameras have respective fields of view exterior of the vehicle and an image processor or image processors may process the image data to determine or detect objects or vehicles present in the field of view of the camera or cameras.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012 and published Jun. 6, 2013 as International Publication No. WO 2013/081984, and/or PCT Application No. PCT/US2012/066571, filed Nov. 27, 2012 and published Jun. 6, 2013 as International Publication No. WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2™ or EYEQ3™ image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/116043; WO 2012/145313; WO 2012/145501; WO 2012/145818; WO 2012/145822; WO 2012/158167; WO 2012/075250; WO 2012/103193; WO 2012/116043; WO 2012/145501; WO 2012/145343; WO 2012/154919; WO 2013/019707; WO 2013/016409; WO 2012/145822; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869 and/or PCT Application No. PCT/US2012/056014, filed Sep. 19, 2012 and published Mar. 28, 2013 as International Publication No. WO 2013/043661, and/or PCT/US2012/071219, filed Dec. 21, 2012 and published Jul. 11, 2013 as International Publication No. WO 2013/103548, and/or PCT Application No. PCT/US2013/026101, filed Feb. 14, 2013 and published Aug. 22, 2013 as International Publication No. WO 2013/123161, and/or PCT Application No. PCT/US2013/027342, filed Feb. 22, 2013 and published Aug. 29, 2013 as International Publication No. WO 2013/126715, and/or PCT Application No. PCT/US2013/036701, filed Apr. 16, 2013 and published Oct. 24, 2013 as International Publication No. WO 2013/158592, and/or U.S. patent application Ser. No. 13/964,134, filed Aug. 12, 2013 and published Feb. 20, 2014 as U.S. Publication No. 2014/0052340; Ser. No. 13/942,758, filed Jul. 16, 2013 and published Jan. 23, 2014 as U.S. Publication No. 2014/0025240; Ser. No.

13/942,753, filed Jul. 16, 2013 and published Jan. 30, 2014 as U.S. Publication No. 2014/0028852; Ser. No. 13/927,680, filed Jun. 26, 2013 and published Jan. 2, 2014 as U.S. Publication No. 2014/0005907; Ser. No. 13/916,051, filed Jun. 12, 2013 and published Dec. 26, 2013 as U.S. Publication No. 2013/0344736; Ser. No. 13/894,870, filed May 15, 2013 and published Nov. 28, 2013 as U.S. Publication No. 2013/0314503; Ser. No. 13/887,724, filed May 6, 2013 and published Nov. 14, 2013 as U.S. Publication No. 2013/0298866; Ser. No. 13/851,378, filed Mar. 27, 2013 and published Nov. 14, 2013 as U.S. Publication No. 2013/0300869; Ser. No. 61/848,796, filed Mar. 22, 2012 and published Oct. 24, 2013 as U.S. Publication No. 2013/0278769; Ser. No. 13/847,815, filed Mar. 20, 2013 and published Oct. 31, 2013 as U.S. Publication No. 2013/0286193; Ser. No. 13/800,697, filed Mar. 13, 2013 and published Oct. 3, 2013 as U.S. Publication No. 2013/0258077; Ser. No. 13/785,099, filed Mar. 5, 2013 and published Sep. 19, 2013 as U.S. Publication No. 2013/0242099; Ser. No. 13/779,881, filed Feb. 28, 2013 and published Sep. 5, 2013 as U.S. Publication No. 2013/0231825; Ser. No. 13/774,317, filed Feb. 22, 2013 and published Aug. 29, 2013 as U.S. Publication No. 2013/0222592; Ser. No. 13/774,315, filed Feb. 22, 2013 and published Aug. 22, 2013 as U.S. Publication No. 2013/0215271; Ser. No. 13/681,963, filed Nov. 20, 2012 and published Jun. 6, 2013 as U.S. Publication No. 2013/0141578; Ser. No. 13/660,306, filed Oct. 25, 2012 and published May 9, 2013 as U.S. Publication No. 2013/0116859; Ser. No. 13/653,577, filed Oct. 17, 2012 and published Apr. 25, 2013 as U.S. Publication No. 2013/0099908; and/or Ser. No. 13/534,657, filed Jun. 27, 2012 and published Jan. 3, 2013 as U.S. Publication No. 2013/0002873, and/or U.S. provisional applications, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/840,542; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/834,128, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/16,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/840,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser. No. 61/804,786, filed Mar. 25, 2013; Ser. No. 61/793,592, filed Mar. 15, 2013; Ser. No. 61/793,614, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/758,537, filed Jan. 30, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/713,772, filed Oct. 15, 2012; Ser. No. 61/710,924, filed Oct. 8, 2012; and/or Ser. No. 61/710,247, filed Oct. 2, 2012, which are all hereby incorporated herein by reference in their entireties. The system may communicate with other communication systems via any suitable means, such as by utilizing aspects of the systems described in International Publication No. WO 2013/043661, PCT Application No. PCT/US2010/038477, filed Jun. 14, 2010 and published Dec. 16, 2010 as International Publication No. WO 2010/144900, and/or PCT Application No. PCT/US2012/066571, filed Nov. 27, 2012 and published Jun. 6, 2013 as International Publication No. WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416 and/or WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. 2013/0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. 2010/0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. 2012/0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501 and/or WO 2012/0145313, and/or PCT Application No. PCT/CA2012/000378, filed Apr. 25, 2012 and published Nov. 1, 2012 as International Publication No. WO 2012/145822, and/or PCT Application No. PCT/US2012/066571, filed Nov. 27, 2012 and published Jun. 6, 2013 as International Publication No. WO 2013/081985, and/or PCT Application No. PCT/US2012/068331, filed Dec. 7, 2012 and published Jun. 13, 2013 as International Publication No. WO 2013/086249, and/or PCT Application No. PCT/US2013/022119, filed Jan. 18, 2013 and published Jul. 25, 2013 as International Publication No. WO 2013/109869, and/or U.S. patent application Ser. No. 13/333,337, filed Dec. 21, 2011 and published Jun. 28, 2012 as U.S. Publication No. 2012/0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular control system, said vehicular control system comprising:

a plurality of sensors disposed at a vehicle equipped with said vehicular control system;

wherein said plurality of sensors comprises a plurality of cameras, and wherein said plurality of cameras comprises (i) a front camera disposed at an in-cabin surface of a windshield of the equipped vehicle and viewing at least forward of the equipped vehicle through the windshield, (ii) a left side camera disposed at a left side of the equipped vehicle and viewing at least sideward of the equipped vehicle, (iii) a right side camera disposed at a right side of the equipped vehicle and viewing at least sideward of the equipped vehicle and (iv) a rear camera disposed at a rear portion of the equipped vehicle and viewing at least rearward of the equipped vehicle;

wherein said plurality of sensors comprises at least one radar sensor disposed at the equipped vehicle and sensing exterior of the equipped vehicle;

a control comprising a data processor, wherein data captured by said at least one radar sensor and data captured by at least one of said plurality of cameras are processed at said control to determine presence of vehicles exterior of the equipped vehicle;

wherein, responsive to data processing at said control of data captured by said at least one radar sensor and data captured by said at least one of said plurality of cameras, said vehicular control system determines respective speeds of the determined vehicles and respective directions of travel of the determined vehicles;

wherein said vehicular control system determines a respective influence value for each of the determined vehicles, and wherein the determined respective influence value for each determined vehicle is based on a determined potential hazard to the equipped vehicle presented by the respective determined vehicle;

wherein the determined respective influence value for each determined vehicle is weighted according to one selected from the group consisting of (i) direction of a speed vector of that determined vehicle and (ii) magnitude of a speed vector of that determined vehicle;

wherein the weighted determined respective influence values for the determined vehicles are ranked according to their hazard potential;

wherein said vehicular control system selects a path of travel for the equipped vehicle responsive to the rankings of the weighted determined respective influence values; and wherein said vehicular control system at least in part controls steering of the equipped vehicle to guide the equipped vehicle along the selected path of travel.

2. The vehicular control system of claim 1, wherein said at least one radar sensor comprises a plurality of radar sensors disposed at the equipped vehicle and sensing exterior of the equipped vehicle.

3. The vehicular control system of claim 1, wherein said plurality of sensors comprises at least one lidar sensor disposed at the equipped vehicle and sensing exterior of the equipped vehicle.

4. The vehicular control system of claim 3, wherein said at least one lidar sensor comprises a plurality of lidar sensors disposed at the equipped vehicle and sensing exterior of the equipped vehicle.

5. The vehicular control system of claim 1, wherein data captured by said at least one radar sensor and data captured by at least said front camera are processed at said control to determine presence of vehicles ahead of the equipped vehicle.

6. The vehicular control system of claim 1, wherein said vehicular control system informs a driver of the equipped vehicle of the selected path of travel.

7. The vehicular control system of claim 1, wherein said vehicular control system at least in part controls a brake system of the equipped vehicle as the equipped vehicle is guided along the selected path of travel.

8. The vehicular control system of claim 1, wherein said vehicular control system determines at least one alternative path of travel for the equipped vehicle to follow that limits conflict with the determined vehicles.

9. The vehicular control system of claim 8, wherein the at least one alternative path of travel for the equipped vehicle to follow is selected by iterating an influence map current condition into a future map condition in time steps.

10. The vehicular control system of claim 1, wherein said vehicular control system selects the path of travel based at least in part on a driving condition at a road being traveled by the equipped vehicle.

11. The vehicular control system of claim 1, wherein, responsive to the weighted determined respective influence values, said vehicular control system determines multiple potential paths for the equipped vehicle.

12. The vehicular control system of claim 11, wherein image data captured by at least one of said plurality of cameras is processed at said control to determine a respective type of vehicle for the determined vehicles, and wherein the path of travel is selected from the multiple determined potential paths responsive at least in part to the determined types of vehicles along one or more of the multiple determined potential paths.

13. The vehicular control system of claim 11, wherein the path of travel is selected based at least in part on rankings of the multiple determined potential paths.

14. The vehicular control system of claim 13, wherein the multiple determined potential paths are ranked based on a likelihood of collision of the equipped vehicle with one or more determined vehicles along the respective determined potential paths.

15. The vehicular control system of claim 13, wherein the multiple determined potential paths are ranked based at least in part on lengths of the respective determined potential paths.

16. The vehicular control system of claim 13, wherein the multiple determined potential paths are ranked based at least in part on determined distances to the one or more determined vehicles from the equipped vehicle for the respective determined potential paths.

17. The vehicular control system of claim 13, wherein the multiple determined potential paths are ranked based at least in part on a level of steering intervention required for the equipped vehicle to follow the respective determined potential path.

18. The vehicular control system of claim 13, wherein the multiple determined potential paths are ranked based at least in part on a level of braking required for the equipped vehicle to follow the respective determined potential path.

19. The vehicular control system of claim 13, wherein the multiple determined potential paths are ranked based at least in part on a level of acceleration required for the equipped vehicle to follow the respective determined potential path.

20. A vehicular control system, said vehicular control system comprising:

a plurality of sensors disposed at a vehicle equipped with said vehicular control system;

wherein said plurality of sensors comprises a plurality of cameras, and wherein said plurality of cameras comprises (i) a front camera disposed at an in-cabin surface of a windshield of the equipped vehicle and viewing at least forward of the equipped vehicle through the windshield, (ii) a left side camera disposed at a left side of the equipped vehicle and viewing at least sideward of the equipped vehicle, (iii) a right side camera disposed at a right side of the equipped vehicle and viewing at least sideward of the equipped vehicle and (iv) a rear camera disposed at a rear portion of the equipped vehicle and viewing at least rearward of the equipped vehicle;

wherein said plurality of sensors comprises at least one radar sensor disposed at the equipped vehicle and sensing exterior of the equipped vehicle;

a control comprising a data processor, wherein data captured by said at least one radar sensor and data captured by at least one of said plurality of cameras are processed at said control to determine presence of vehicles exterior of the equipped vehicle;

wherein, responsive to data processing at said control of data captured by said at least one radar sensor and data captured by said at least one of said plurality of cameras, said vehicular control system determines respective speeds of the determined vehicles and respective directions of travel of the determined vehicles;

wherein said vehicular control system determines a respective influence value for each of the determined vehicles, and wherein the determined respective influence value for each determined vehicle is based on a determined potential hazard to the equipped vehicle presented by the respective determined vehicle;

wherein the determined respective influence value for each determined vehicle is weighted according to one selected from the group consisting of (i) direction of a speed vector of that determined vehicle and (ii) magnitude of a speed vector of that determined vehicle;

wherein, responsive to the weighted determined respective influence values, said vehicular control system determines multiple potential paths for the equipped vehicle;

wherein the multiple determined potential paths for the equipped vehicle are ranked according to their hazard potential;

wherein said vehicular control system selects a path of travel for the equipped vehicle responsive at least in part to the rankings of the multiple determined potential paths;

wherein said vehicular control system selects the path of travel based at least in part on a driving condition at a road being traveled by the equipped vehicle; and wherein said vehicular control system at least in part controls steering of the equipped vehicle to guide the equipped vehicle along the selected path of travel.

21. The vehicular control system of claim 20, wherein the path of travel is selected based at least in part on rankings of the multiple determined potential paths.

22. The vehicular control system of claim 20, wherein the multiple determined potential paths are ranked based on likelihood of collision of the equipped vehicle with one or more determined vehicles along the respective determined potential paths.

23. The vehicular control system of claim 20, wherein the multiple determined potential paths are ranked based at least in part on lengths of the respective determined paths.

24. The vehicular control system of claim 20, wherein the multiple determined potential paths are ranked based at least in part on determined distances to one or more determined vehicles from the equipped vehicle for the respective determined potential paths.

25. The vehicular control system of claim 20, wherein the multiple determined potential paths are ranked based at least in part on a level of steering intervention required for the equipped vehicle to follow the respective determined potential path.

26. The vehicular control system of claim 20, wherein the multiple determined potential paths are ranked based at least in part on a level of braking required for the equipped vehicle to follow the respective determined potential path.

27. The vehicular control system of claim 20, wherein the multiple determined potential paths are ranked based at least in part on a level of acceleration required for the equipped vehicle to follow the respective determined potential path.

28. A vehicular control system, said vehicular control system comprising:

a plurality of sensors disposed at a vehicle equipped with said vehicular control system;

wherein said plurality of sensors comprises a plurality of cameras, and wherein said plurality of cameras comprises (i) a front camera disposed at an in-cabin surface of a windshield of the equipped vehicle and viewing at least forward of the equipped vehicle through the windshield, (ii) a left side camera disposed at a left side of the equipped vehicle and viewing at least sideward of the equipped vehicle, (iii) a right side camera disposed at a right side of the equipped vehicle and viewing at least sideward of the equipped vehicle and (iv) a rear camera disposed at a rear portion of the equipped vehicle and viewing at least rearward of the equipped vehicle;

wherein said plurality of sensors comprises a plurality of radar sensors disposed at the equipped vehicle and sensing exterior of the equipped vehicle;

a control comprising a data processor, wherein data captured by at least one of said plurality of radar sensors and data captured by at least one of said plurality of cameras are processed at said control to determine presence of vehicles exterior of the equipped vehicle;

wherein, responsive to data processing at said control of data captured by said at least one of said plurality of radar sensors and data captured by said at least one of said plurality of cameras, said vehicular control system determines respective speeds of the determined vehicles and respective directions of travel of the determined vehicles;

wherein said vehicular control system determines a respective influence value for each of the determined vehicles, and wherein the determined respective influence value for each determined vehicle is based on a determined potential hazard to the equipped vehicle presented by the respective determined vehicle;

wherein the determined respective influence value for each determined vehicle is weighted according to one selected from the group consisting of (i) direction of a speed vector of that determined vehicle and (ii) magnitude of a speed vector of that determined vehicle;

wherein the weighted determined respective influence values for the determined vehicles are ranked according to their hazard potential;

wherein said vehicular control system selects a path of travel for the equipped vehicle responsive to the rankings of the weighted determined respective influence values;

wherein said vehicular control system informs a driver of the equipped vehicle of the selected path of travel;

wherein said vehicular control system at least in part controls steering of the equipped vehicle to guide the equipped vehicle along the selected path of travel; and wherein said vehicular control system at least in part controls a brake system of the equipped vehicle as the equipped vehicle is guided along the selected path of travel.

29. The vehicular control system of claim 28, wherein said vehicular control system determines at least one alternative path of travel for the equipped vehicle to follow that limits conflict with the determined vehicles.

30. The vehicular control system of claim 29, wherein the at least one alternative path of travel for the equipped vehicle to follow is selected by iterating an influence map current condition into a future map condition in time steps.

31. The vehicular control system of claim 28, wherein said vehicular control system selects the path of travel based at least in part on a driving condition at a road being traveled by the equipped vehicle.

* * * * *

UNITED STATES PATENT AND TRADEMARK OFFICE
CERTIFICATE OF CORRECTION

| | |
|---|---|
| PATENT NO. | : 10,733,892 B2 |
| APPLICATION NO. | : 16/173080 |
| DATED | : August 4, 2020 |
| INVENTOR(S) | : Goerg Pflug |

It is certified that error appears in the above-identified patent and that said Letters Patent is hereby corrected as shown below:

In the Specification

<u>Column 9</u>
Line 14, "'hatha'" should be --'matha'--

Signed and Sealed this
First Day of September, 2020

Andrei Iancu
*Director of the United States Patent and Trademark Office*